Oct. 29, 1968     W. P. KRAFT     3,408,040
VARIABLE CONTROL METERING AND CHECK VALVE
Filed Dec. 13, 1965
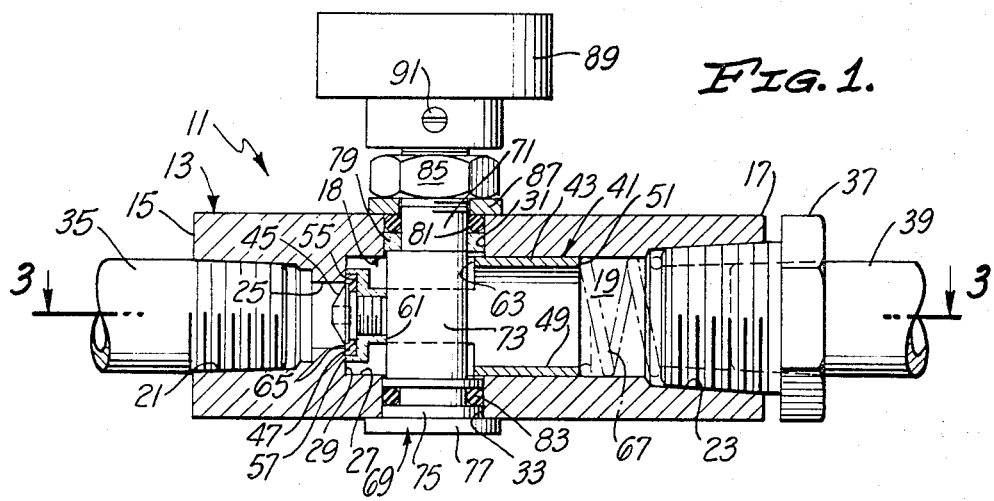
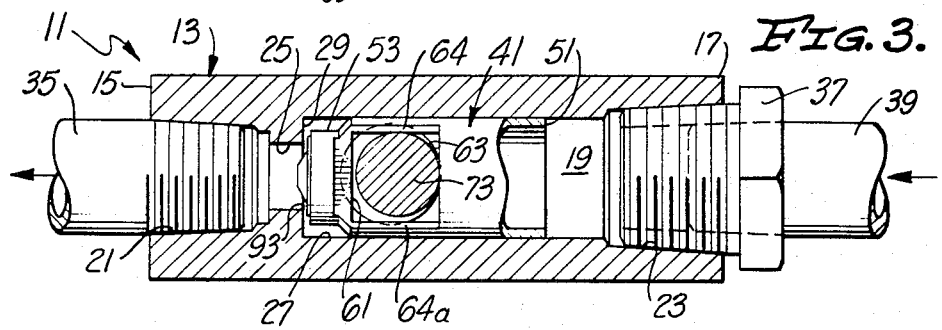
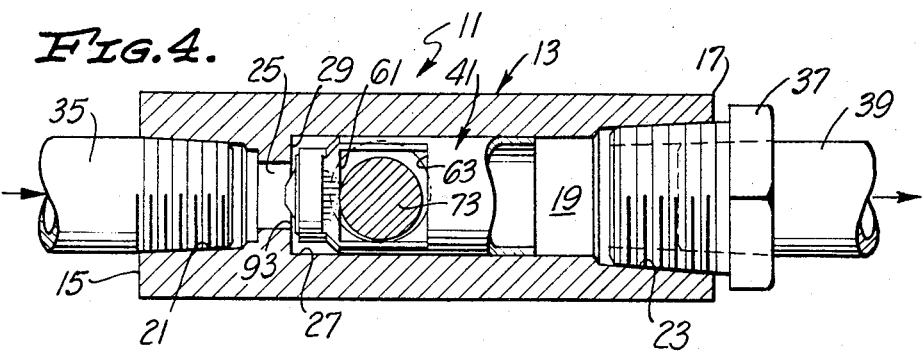
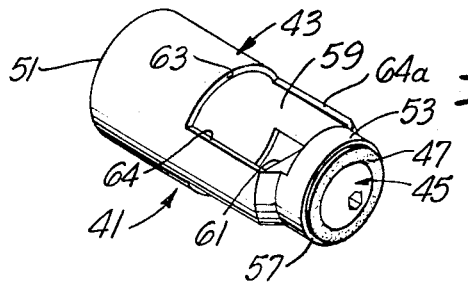
INVENTOR.
WILBUR P. KRAFT
BY HIS ATTORNEYS
HARRIS, KIECH, RUSSELL & KERN

United States Patent Office 3,408,040
Patented Oct. 29, 1968

3,408,040
VARIABLE CONTROL METERING AND CHECK VALVE
Wilbur P. Kraft, 431 Lomita St.,
El Segundo, Calif. 90245
Filed Dec. 13, 1965, Ser. No. 513,331
4 Claims. (Cl. 251—257)

ABSTRACT OF THE DISCLOSURE

A valve comprising a hollow cylindrical valve element movable axially of a bore in a housing and having a closed end engageable with a valve seat at one end of the bore. When the valve element is unseated, fluid flows through the hollow valve element and portions of the bore between axially spaced ports in the housing in axial alignment with the bore and the valve seat. A transverse cam is journalled in the housing and extends through the housing and the valve element, the latter being provided with axially spaced edges selectively engageable by the cam to move the valve element toward or away from its seat. The cam moves over center slightly in both extreme positions of the valve element to mechanically lock the valve element in its extreme positions. Additionally, the edges of the valve element which are selectively engageable by the cam are spaced apart a distance greater than the diameter of the cam to provide a lost motion connection therebetween. A nut on the cam shaft locks the cam positively in any desired position.

Background of invention

In many piping installations, in addition to the usual flow control requirements it is necessary to control the quantity of fluid flowing to a given component of the system while automatically preventing backflow of fluid from such component. In other instances, it is necessary or desirable to control the quantity of fluid flowing to the component while automatically limiting the amount of backflow to a lesser quantity. To accomplish this, various complex valving arrangements have been needed.

Summary and objects of invention

Accordingly, a primary object of this invention is to provide a unitary valve which will function both as a check valve and a flow control valve.

Still another object of this invention is to provide a unitary valve which functions as a flow control valve when fluid tends to move through the valve in a first direction and automatically functions as a check valve when fluid tends to move through the valve in the opposite direction.

A further object of this invention is to provide a unitary valve which can be mechanically held in the closed position, mechanically moved to a mechanical fully open position, and which can be moved from the latter position to a fully open position in response to fluid flowing through the valve in a predetermined direction.

Another object of this invention is to provide a unitary valve which limits the amount of fluid that can flow through the valve in one direction and automatically limits the amount of fluid that can flow through the valve in the opposite direction to a lesser quantity.

Another object of this invention is to utilize lost-motion positioning means for moving the valve element axially in the flow passageway.

It is an object of this invention to provide a combination check and flow-control valve which can be quickly assembled and disassembled for repair or replacement of parts. Another object is to provide a valve housing which can be quickly and easily machined.

A further object of this invention is to provide a combination check and flow-control valve which may be quickly opened and the settings of which may be quickly adjusted.

Briefly stated, the objects of this invention may be accomplished by providing a housing having an inlet, an outlet, a flow passageway connecting the inlet and the outlet, and a valve seat in the flow passageway; a pressure-responsive valve element engageable with the valve seat to block the flow passageway to define a closed position of the valve element, the valve element being slidable axially in said flow passageway out of engagement with the valve seat to a fully open position; cam means for camming the valve element to an intermediate position between the closed and fully open positions, the cam means being disaligned axially from the valve element; and means connecting the cam means to the valve element for movement therewith and for movement a limited distance relative thereto, the valve element being movable said limited distance from said intermediate position toward the fully open position in response to the flow of fluid through the flow passageway from the inlet toward the outlet.

The invention both as to its organization and method of operation together with further objects and advantages thereof may best be understood by reference to the following description taken in connection with the accompanying drawing.

Description of drawing

In the drawing:
FIG. 1 is a vertical sectional view of a valve constructed in accordance with the teachings of this invention, the valve being shown in the fully closed position;
FIG. 2 is a perspective view of a valve element constructed in accordance with the teachings of this invention;
FIG. 3 is a horizontal sectional view taken along the line 3—3 of FIG. 1, illustrating the valve element in the mechanically fully open position and capable of movement to the fully open position; and
FIG. 4 is a horizontal sectional view similar to FIG. 3 but with the valve element in an open position and movable to the closed position in response to a reversal of flow.

Description of exemplary embodiment of invention

Referring to the drawing, and in particular to FIG. 1 thereof, reference numeral 11 designates a valve constructed in accordance with the teachings of this invention. The valve 11 includes a housing 13, a first end 15, a second end 17, and an internal wall 18 defining a flow passageway 19 which interconnects the ends of the housing. The flow passageway 19 has axially spaced and aligned threaded sections or ports 21 and 23 adjacent the ends 15 and 17, respectively, an orifice portion or auxiliary bore 25 of reduced diameter, a generally cylindrical valve element mounting portion or main bore 27 of a larger diameter, and a shoulder or valve seat 29 between the orifice portion and the valve element mounting portion. Preferably the valve seat 29 is flat and lies in a plane which is perpendicular to the axis of the flow passageway 19. A pair of coaxial openings 31 and 33 extend from the valve element mounting portion 27 to the exterior of the housing 13. The common axis of the openings 31 and 33 is preferably perpendicular to the axis of the flow passageway 19.

A conduit 35 and a tubular fitting 37 are threadedly received by the threaded sections 21 and 23, respectively.

Another conduit 39 is threadedly received by the tubular fitting 37. The conduits 35 and 39 connect the valve 11 into a piping system (not shown) through which it may be desirable to have fluid flow in measured quantities in one or both directions.

A pressure-responsive valve element 41 (FIGS. 1 and 2) is slidably mounted in the portion 27 of the flow passageway 29. The valve element 41 includes a hollow generally cylindrical body member or sleeve portion 43, a closed nose portion 45, and an annular resilient sealing element 47. The body member 43 fits slidably in the valve element mounting portion 27 and has a generally cylindrical passageway 49 extending axially therethrough. The body member 43 has an open rear end 51, a reduced diameter portion 53, a shoulder 55 engageable with the sealing element 47, and a circular rim 57 surrounding the sealing element and engageable with the valve seat 29.

A rectangular aperture 59 extends transversely through the body member 43 and is alignable with the openings 31 and 33 in the housing 13. The walls of the aperture 59 define a cam follower surface and include axially spaced opposed parallel transverse wall surfaces or cam follower edges 61 and 63 which are generally transverse to the longitudinal axis of the flow passageway. The aperture also has longitudinal walls 64 and 64a. It will also be noted from FIGS. 3 and 4 that fluid can flow through portions of the aperture 59 between the interior of the valve element 41 and the main bore 27 adjacent the seat 29.

The nose portion 45 of the valve element 41 is threadedly secured to the body member 43 and in the closed position illustrated in FIG. 1 lies at least partially within the orifice portion 25 of the flow passageway 19. The nose portion 45 has an annular flange 65 which forces the resilient sealing element 47 against the shoulder 55 and the inside of the rim 57. As shown in FIG. 1, the sealing element 47 tightly engages the valve seat 29 in the closed position. If desired, a spring 67 (FIG. 1) can be provided to bias the valve element 41 toward the closed position.

The valve element 41 is slidable axially in the flow passageway 19 between the closed position shown in FIG. 1 and a fully open position. A shaft 69 is journalled in the housing 13 to move the valve element 41 axially within the flow passageway 19. The shaft 69 is preferably an integral metal structure and includes a stem portion 71, a cylindrical cam or eccentric 73, a stub shaft 75 and an enlarged head 77. The stem portion 71 and the stub shaft 75 mount the shaft 69 for rotation in the openings 31 and 33, respectively, and the cam 73 extends through the aperture 59 in the valve element 41. The stem portion 71 is mounted in a bearing 79 and resilient O-rings 81 and 83 prevent leakage between the housing 13 and the shaft 69. A locking nut 85 is threaded on the stem portion 71 and clamps a washer 87 against the housing 13. A valve handle 89 is secured to the upper part of the stem portion 71 by a set screw 91. Thus, the valve element is connected to the cam 73 for movement therewith and for movement a limited distance relative thereto.

The valve handle 89 and the shaft 69 can be locked in a predetermined angular position by tightening the locking nut 85 which causes the head 77 to bear tightly against the lower side of the housing 13. With the locking nut tightened, the friction between the head 77 and the housing 13 is sufficient to lock the shaft 69 in position.

The primary functions of the cam 73 are to lock the valve element 41 in the closed position, to move the valve element axially within the flow passageway 19 and to form an abutment for engagement by the wall surfaces 61 and 63. The geometrical axis of the cam 73 is spaced from the axis of rotation of the shaft 69, i.e. the cam is mounted eccentrically, for a purpose to be described more fully hereinafter. The diameter of the cam 73 is less than the distance between the wall surfaces 61 and 63 of the cam follower and also less than the distance between the longitudinal walls 64 and 64a. The cam 73 is engageable with the wall surfaces 61 and 63 but, because of the spacing therebetween, it is readily apparent that only one of the wall surfaces will engage the cam at any one time.

For purposes of explaining the operation of the device, an imaginary line extending in a horizontal plane from the axis of rotation of the cam 81 to the point on the cam surface or periphery which is farthest from the aforementioned axis will be referred to as the major radius of the cam 81, and the cam will be considered at a dead center position when said major radius of the cam extends axially within the flow passageway 19. Preferably, the major radius is positioned slightly beyond dead center, e.g. 5°–10° when the valve element 41 is in the mechanically closed position. In this position, the cam 73 bears against the wall surface 61 to urge the valve element 41 tightly against the valve seat 29, and also effects a toggle action so that water hammer or mechanical vibrations do not move it toward the open position.

The valve is also capable of performing numerous other functions. Assuming that the combined effect of the pressures in the conduits 35 and 39 and the force of the spring 67 (if one is utilized) is to force the valve element 41 against the valve seat 29, the first increment of counterclockwise rotation of the cam 73 will impart no perceptible movement to the valve element 41 because the cam is spaced a small distance from the wall surface 63 (FIG. 1). The cam 73 may be rotated until the major radius is perpendicular to the longitudinal axis of the flow passageway 19 (FIG. 4) without camming the valve element to an open position. If the fluid should flow in the direction of the arrows in FIG. 4, such fluid will force the valve element 41 to the position shown in FIG. 4 in which the valve element is spaced from the valve seat 29 to define a port 93 therebetween. If the direction of flow should reverse, the fluid would force the valve element 41 back into the fluid closed position which would not have the toggle action to maintain it closed, as in the mechanically closed position. Thus, with the cam 73 so positioned, the valve acts as a check valve. By rotating the cam 73 clockwise from the position shown in FIG. 4 toward the closed position, the valve element will be cammed toward the closed position. Thus, the quantity of fluid that may flow through the valve in the direction of the arrows in FIG. 4 can be controlled.

By rotating the cam 73 counterclockwise until the major radius is again slightly beyond the dead center position to the right of the axis of rotation of the cam (FIG. 3), i.e. 5°–10°, the valve may be cammed or mechanically moved (as opposed to movement caused by fluid under pressure) to the mechanically fully open position where a similar toggle action will maintain the cam against water hammer and mechanical vibration.

In the mechnically fully open position shown in FIG. 3, the cam 73 engages the wall surface 63 but is spaced a limited distance from the wall surface 61. This position of the valve element 41 is maintained so long as the direction of fluid flow is in the direction of the arrows in FIG. 3. That is, the valve element 41 operates to meter the amount of fluid flow in the direction of the arrows. If the flow through the valve should be reversed, the fluid under pressure would force the valve element 41 to the right until the wall surface 61 engages the cam 73. This is the fully open position of the valve.

It is apparent therefore that with the cam 72 in the position shown in FIG. 3, fluid may flow through the valve in either direction, but that more fluid may flow for a given pressure differential from the conduit 35 to the conduit 39 than in the reverse direction. By setting the major radius at a position intermediate that illustrated in FIGS. 3 and 4, other mechanically open positions are established and the amount of fluid permitted to flow in either direction is varied accordingly.

Thus, the cam 73 serves as adjustable positioning means for selectively moving the valve element 41 to a plurality of positions between the mechanically closed position shown in FIG. 1 and the mechanically fully open position shown in FIG. 3. The cam follower including the wall surfaces 61 and 63 serves as means for limiting the movement of the valve element 41 to a limited distance relative to the cam 73 and away from the position at which the valve element has been mechanically set by the cam 73. Thus, the cam 73 and the wall surfaces 61 and 63 constitute lost-motion means in that the value element 41 is capable of motion independently of the cam due to the spacing of the surfaces 61 and 63.

Although the amount by which the spacing between the wall surfaces 61 and 63 exceeds the diameter of the cam 73 is referred to herein as a small or limited distance, it should be understood that this distance may be varied depending upon the operating requirements of the piping installation. By way of illustration, this small distance would be greater than the spacing normally found between the parts of a valve due to machining tolerances. Also by way of illustration, this small distance would be less than the distance between the closed and fully open positions. Preferably the limited distance is large enough to allow the valve element to check or stock backflow (i.e. flow in the direction of the arrow in FIG. 3) when the major radius is perpendicular to the longitudinal axis of the flow passageway 19, and sufficiently small to allow metered backflow with the major radius intermediate the position shown in FIGS. 3 and 4.

The valve element 41 may be quickly moved between the positions of FIGS. 1 and 3 by rotating the cam 73 through an angle of slightly more than 180°. If desired, adjustable stops (not shown) may be provided to limit the angle through which the cam 73 may be turned.

Thus, a valve constructed in accordance with the teachings of this invention will function as a check valve, as a flow control valve, and as a shut-off and metering valve. When fluid flows from the conduit 39 to the conduit 35, the valve functions either as a shut-off valve or a check valve and permits no fluid to flow, or as a metering valve to permit a predetermined quantity of fluid to flow depending upon the setting of the cam 73. When fluid is flowing from the conduit 35 to the conduit 39, the valve 11 functions as a shut-off valve or as a flow-control valve to allow passage of predetermined quantities of fluid therethrough, depending on the position of the cam 73. With the cam 73 in an intermediate position the valve 11 will pass a given quantity of fluid in one direction and a lesser quantity of fluid in the opposite direction.

Many changes, modifications, and substitutions may be made by one having ordinary skill in the art without necessarily departing from the spirit and scope of this invention.

I claim as my invention:

1. In a valve, the combination of:
    (a) a housing provided with spaced ports interconnected by a main bore adjacent and communicating with one of said ports and an auxiliary bore of smaller diameter than said main bore adjacent and communicating with the other of said ports, said ports and said bores all being axially aligned;
    (b) a valve seat in said housing at the junction of said main and auxiliary bores and facing said one port;
    (c) a cylindrical hollow valve element slidable axially of said main bore and having a closed end engageable with valve seat, the other end of said valve element being open;
    (d) said valve element having a transversely extending aperture therethrough a portion of which provides fluid communication between said main bore and the interior of said valve element adjacent said closed end of said valve element;
    (e) whereby fluid can flow from said one port through a portion of said main bore, through said hollow valve element, through said portion of said aperture, through another portion of said main bore, through said valve seat, and through said auxiliary bore, to said other port, and vice versa, when said closed end of said valve element is axially spaced from said valve seat;
    (f) said aperture further providing said valve element with axially spaced transverse cam follower edges;
    (g) a rotatable cam extending transversely through said housing and said aperture in said valve element and journalled in said housing and selectively engageable with said transverse cam follower edges to move said valve element toward or away from said valve seat; and
    (h) means, including a cam shaft, connected to said cam for rotating said cam between angularly spaced open and closed positions respectively corresponding to axially spaced extreme positions of said valve element wherein said valve element is seated on and spaced axially from said valve seat.

2. A valve as defined in claim 1 wherein the angular spacing between said open and closed positions of said cam exceeds 180° to provide for over center movement of said cam as it approaches each of said open and closed positions thereof, thereby mechanically locking said valve element in each of its said extreme positions with a toggle action.

3. A valve according to claim 1 including a nut threaded on said cam shaft and engageable with said housing to lock said cam in any desired angular position intermediate its said open and closed positions.

4. A valve as set forth in claim 1 wherein said cam is cylindrical and has a diameter less than the axial spacing between said cam follower edges so as to provide a lost motion connection between said cam and said valve element.

References Cited

UNITED STATES PATENTS

| 142,763 | 9/1873 | Birkett | 251—89 X |
| 1,545,821 | 7/1925 | Eubanks et al. | 251—83 |
| 1,689,236 | 10/1928 | Fraser | 251—90 X |
| 2,267,057 | 12/1941 | Verner | 251—257 |
| 2,357,965 | 9/1944 | Mattimore | 251—257 X |
| 2,408,006 | 9/1946 | Smith | 251—257 X |

WILLIAM F. O'DEA, *Primary Examiner.*

DAVID R. MATTHEWS, *Assistant Examiner.*